US011299671B2

United States Patent
Zhang et al.

(10) Patent No.: US 11,299,671 B2
(45) Date of Patent: Apr. 12, 2022

(54) PREPARATION METHOD FOR GRAPHENE QUANTUM DOTS WITH DIFFERENT OXYGEN CONTENTS, GRAPHENE QUANTUM DOT, AND FLUORESCENT MATERIAL

(71) Applicant: Linde Zhang, Shenzhen (CN)

(72) Inventors: Linde Zhang, Shenzhen (CN); Mingdong Zhang, Shenzhen (CN)

(73) Assignee: Linde Zhang, Shenzhen (CN)

( * ) Notice: Subject to any disclaimer, the term of this patent is extended or adjusted under 35 U.S.C. 154(b) by 590 days.

(21) Appl. No.: 15/744,852

(22) PCT Filed: Aug. 25, 2016

(86) PCT No.: PCT/CN2016/096709
§ 371 (c)(1),
(2) Date: Jan. 15, 2018

(87) PCT Pub. No.: WO2017/032330
PCT Pub. Date: Mar. 2, 2017

(65) Prior Publication Data
US 2018/0230379 A1  Aug. 16, 2018

(30) Foreign Application Priority Data

Aug. 25, 2015  (CN) .......................... 201510528994.9

(51) Int. Cl.
*C09K 11/65* (2006.01)
*C01B 32/184* (2017.01)
(Continued)

(52) U.S. Cl.
CPC ............ *C09K 11/65* (2013.01); *C01B 32/184* (2017.08); *B82Y 20/00* (2013.01); *B82Y 30/00* (2013.01);
(Continued)

(58) Field of Classification Search
CPC ..... C09K 11/65; C01B 32/182; C01B 32/184; C01B 32/188; C01B 32/19; C01B 32/192; C01B 32/194; C01B 32/196; C01B 32/198
See application file for complete search history.

(56) References Cited

U.S. PATENT DOCUMENTS

2012/0116094 A1* 5/2012 Swager ................ C07D 303/38
548/256

FOREIGN PATENT DOCUMENTS

CN  102660270 A  9/2012
CN  102849724 A  1/2013
(Continued)

OTHER PUBLICATIONS

Yonggang. Machine translation of CN10373894. Retrieved from google patents from URL: https://patents.google.com/patent/CN103738941A/en?oq=103738941. Patent filed Nov. 14, 2013 Retrieved on Jun. 14, 2020. (Year: 2013).*
(Continued)

*Primary Examiner* — Matthew E. Hoban
(74) *Attorney, Agent, or Firm* — Bayramoglu Law Offices LLC

(57) ABSTRACT

The present invention provides a preparation method for graphene quantum dots with different oxygen contents, including the following steps: Step 1: dispersing a graphene oxide in a peroxide solution to obtain a graphene oxide dispersion; Step 2: mixing the graphene oxide dispersion with an alkali liquor, purifying to obtain a graphene quantum dot dry powder; Step 3: loading the graphene quantum dots dry powder on a carrier, performing a gradient elution to obtain a plurality of graphene quantum dots with different oxygen contents. The preparation method for graphene quantum dots can realize the control of oxygen content of the graphene quantum dots. Therefore, the control of the (Continued)

emission wavelength of the product is achieved, which provides a reliable premise for applications of the graphene quantum dots in the fields of LED, cell labeling, etc. In addition, the method provided by the present invention is also simple and easy to operate.

9 Claims, 6 Drawing Sheets

(51) Int. Cl.
 *B82Y 30/00* (2011.01)
 *B82Y 20/00* (2011.01)
 *B82Y 40/00* (2011.01)

(52) U.S. Cl.
 CPC ............ *B82Y 40/00* (2013.01); *Y10S 977/734* (2013.01); *Y10S 977/774* (2013.01); *Y10S 977/842* (2013.01); *Y10S 977/95* (2013.01)

(56) References Cited

FOREIGN PATENT DOCUMENTS

| CN | 102876327 A | 1/2013 |
| CN | 103738941 A | 4/2014 |
| CN | 103965867 A | 8/2014 |
| CN | 104477900 A | 4/2015 |
| CN | 104556004 A | 4/2015 |

OTHER PUBLICATIONS

Bai. Machine translation of CN102660270. Retreived from google patents from URL: https://patents.google.com/patent/CN102660270A/en?oq=CN 102660270. Patent filed May 3, 2012. Retrieved on Jun. 14, 2020 (Year: 2012).*

Stengl. Blue and green luminescence of reduced grapheneoxide quantum dots. Carbon 63 (2013) 537-546 (Year: 2013).*

Bourgougnon. On the Reaction of Hydrogen Peroxide With Potassium Permanganate in Presence of Sulphuric Acid. J. Am. Chem. Soc. 1889, 11, 6, 94-98 (Year: 1889).*

* cited by examiner

PREPARATION METHOD FOR GRAPHENE QUANTUM DOTS WITH DIFFERENT OXYGEN CONTENTS, GRAPHENE QUANTUM DOT, AND FLUORESCENT MATERIAL

CROSS REFERENCE TO RELATED APPLICATIONS

This application is the national phase entry of International Application No. PCT/CN2016/096709, filed on Aug. 25, 2016, which is based upon and claims priority to Chinese Patent Application No. 201510528994.9 filed on Aug. 25, 2015 titled "preparation method for graphene quantum dots with different oxygen contents, graphene quantum dot, and fluorescent material", the entire contents of which are incorporated herein by reference.

TECHNICAL FIELD

The present invention relates to the field of fluorescent nanonmaterials, in particular to a preparation method for graphene quantum dots with different oxygen contents, graphene quantum dot, and fluorescent material.

BACKGROUND OF THE INVENTION

Since the first successful dissection of pyrolytic graphite and observation of graphene by Andre Geim and Konstantin Novoselof from the University of Manchester in the United Kingdom in 2004, the research enthusiasm for new types of carbon materials has not diminished ever. The successful separation of the graphene means that theoretical predictions about the thermodynamic instability of two-dimensional crystals have been broken, thus, bringing out many new fields of research.

Perfect graphene has an ideal two-dimensional structure, which consists of hexagonal lattices. Each carbon atom bonds with the other three carbon atoms in the plane of the lattice by σ bonds. Electrons that do not form the σ bonds act as the π electrons to make up a π-orbital system perpendicular to the plane of the lattice. π electrons can move freely in the plane. But more importantly, due to the unique structure of graphene, the band structure thereof is in the form of Dirac cone. Because the conduction band and valence band of the graphene meet at the Dirac points, the effective mass of the electrons and the holes at the Dirac points is zero. The corresponding hole and electron mobilities are expected to be nearly identical and infinitely close to infinity, which means that the carriers can be either holes or electrons. The carrier mobility is high. Therefore, the ideal graphene should have excellent electrical conductivity. It is predicted that it can withstand current densities six orders of magnitude higher than that of copper.

At present, a series of exciting research work has been published on large sheet graphene. And studies on two-dimensional graphene and graphene oxide particles whose sheet scales and sizes are limited in the Bohr radius are also growing vigorously. For such graphene particles, due to the retention of certain oxidation functional groups or defects and the reduction of their sizes, their energy bands are not continuous, thereby resulting in their carriers could be stimulated. The carriers are stimulated to form excitons, and the excitons are limited in the bandgaps in three space directions of the graphene. The thickness of a single-layer graphene is about 1 nm, the sheet size is about a Bohr radius. Due to a big bandgap of such a graphene, after excitation degenerates, a wide laser emission wavelength is formed and the laser characteristics is excellent. This kind of graphene particles have characteristics similar to that of the semiconductor quantum dots in inorganic materials. Therefore, they are called graphene quantum dots. The radii of the graphene quantum dots are within the Bohr radius, which is non-toxic with narrow fluorescent wavelength and wide laser wavelength and will be greatly applied in the fields of light-emitting diode (LED), bio-imaging, photovoltaic devices and sensors.

At present, there are four kinds of preparation methods mainly used in the research of graphene quantum dots. The four methods are respectively twice oxidation method of graphene which re-oxidizes the graphene, organic synthesis method which starts from small molecules, etching method using electron beam or ion beam and microscopic cutting method of the carbon material. However, the existing preparation methods cannot prepare graphene quantum dots with controllable oxygen content, which leads to no control over the emission wavelength of the product. In other words, because it is impossible to select a suitable emission color, it is difficult to form suitable color coordinates in applications such as LED. In addition, graphene quantum dots with low oxygen contents are often oil-soluble, which is difficult to be applied in bio-applications. While, if processed into graphene quantum dots with a certain oxygen content, the solubility of graphene quantum dots in the aqueous phase can be improved, which facilitates the biological applications such as cell labeling.

SUMMARY OF THE INVENTION

The technical problem to be solved in the present invention is to overcome the drawbacks of the prior art and to provide a preparation method for graphene quantum dots with different oxygen contents.

The present invention provides a preparation method for graphene quantum dots with different oxygen contents, including the following steps:

Step 1: dispersing a graphene oxide in a peroxide solution to obtain a graphene oxide dispersion;

Step 2: mixing the graphene oxide dispersion with an alkali liquor, purifying to obtain a graphene quantum dot dry powder;

Step 3: loading the graphene quantum dots dry powder on a carrier, performing a gradient elution to obtain a plurality of graphene quantum dots with different oxygen contents.

Wherein a carbon-to-oxygen ratio of the graphene oxide is 0.5-5, a mass concentration of the graphene oxide in the graphene oxide dispersion is 0.1%-5%; and/or, a mass concentration of the peroxide solution is 3%-30%. The peroxide is at least one of hydrogen peroxide, ammonium persulfate, sodium persulfate, potassium hydrogen persulfate, sodium perborate, dibenzoyl peroxide and dilauroyl peroxide.

Step 2 further includes the following sub-steps after the purification: reacting the purified product with a reducing agent in a solvent, purifying to obtain the graphene quantum dot dry powder.

Specifically, the gradient elution in Step 3 is: gradient elution is performed using vacuum liquid chromatography or column chromatography. An eluent used for the gradient elution includes a first polar solvent and a second polar solvent. The polarity of the first polar solvent is greater than that of the second polar solvent. Wherein the first polar solvent is one or more selected from the group consisting of water, methanol, ethanol, ethylene glycol, hydrochloric acid-methanol solution, tetrahydrofuran, formic acid, acetic acid, acetonitrile, N, N-dimethylformamide, diethyl ether, acetone and nitromethane. The second polar solvent is one or more selected from the group consisting of cyclohexane, n-hexane, petroleum ether, ethyl acetate, dimethyl carbonate, dichloromethane, trichloromethane and carbon tetrachloride.

And, the present invention provides a graphene quantum dot, wherein the graphene quantum dot has an oxygen content of 2%-40%.

Further, the graphene quantum dot has an emission wavelength of 550 nm to 750 nm.

Further, the present invention provides a fluorescent material, including the plurality of graphene quantum dots prepared by the above-mentioned preparation method for graphene quantum dots with different oxygen contents.

The present invention provides a preparation method for graphene quantum dots with different oxygen contents, which includes the steps of: firstly, dispersing a graphene oxide in a peroxide solution to obtain a graphene oxide dispersion. Peroxide is used as an oxidant in this step. The peroxide can be helpful to form graphene quantum dots with a wide distribution of oxygen content, which provides a premise for subsequently obtaining graphene quantum dots with different oxygen contents. Then, mixing the graphene oxide dispersion with an alkali liquor to obtain a graphene quantum dot. Finally, performing a gradient elution to the graphene quantum dot after loading on a carrier, obtaining a plurality of graphene quantum dots with different oxygen contents by changing the polarity of the eluent. It can be seen that the controlling of oxygen content of the graphene quantum dots is achieved by adopting the method provided by the present invention. Therefore, the control of the emission wavelength of the product is achieved, which provides a reliable premise for applications of the graphene quantum dots in the fields of LED, cell labeling, etc. In addition, the method provided by the present invention is also simple and easy to operate.

DETAILED DESCRIPTION OF THE INVENTION

Figure 1:
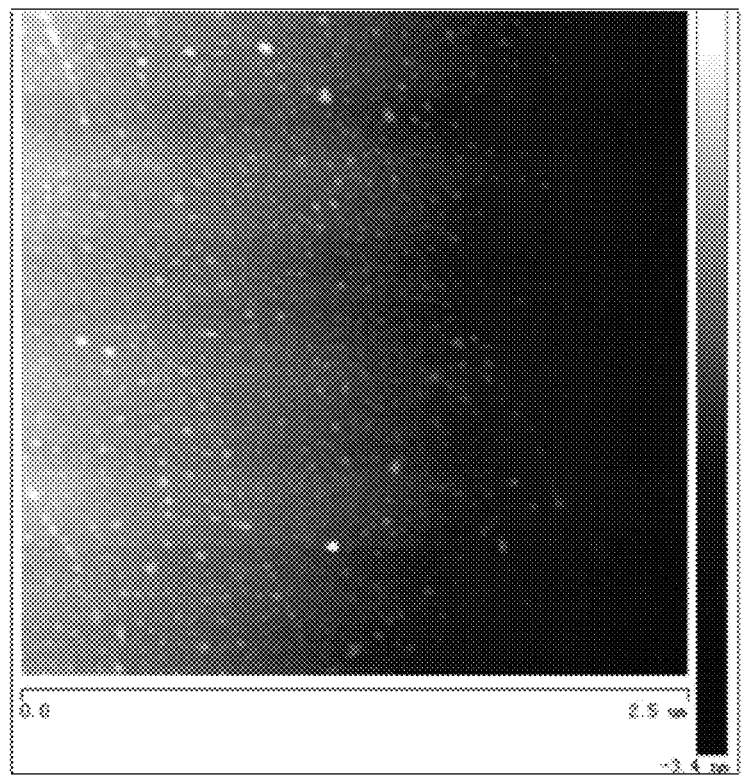
FIG. 1 is an atomic force microscope image of Sample 1 in Embodiment 1 of the present invention.

In order to make the objectives, technical solutions and advantages of the present invention more comprehensible, the present invention is further described below in detail with reference to the accompanying drawings and embodiments. It should be understood that the specific embodiments described herein are merely used to explain the present invention, and are not intended to limit the scope of the present invention.

The present invention provides a preparation method for graphene quantum dots with different oxygen contents, including the following steps:

Step 1: dispersing a graphene oxide in a peroxide solution to obtain a graphene oxide dispersion;

Step 2: mixing the graphene oxide dispersion with an alkali liquor, purifying to obtain a graphene quantum dot dry powder;

Step 3: loading the graphene quantum dots dry powder on a carrier, performing a gradient elution to obtain a plurality of graphene quantum dots with different oxygen contents.

Step 1 is the preparation process of graphene oxide dispersion. Wherein in order to avoid aggregation of the graphene oxide, etc., the dispersion is preferably carried out by ultrasonic dispersion. Further, the time for the ultrasonic dispersion may be 0.5 h to 2 h. The peroxide is used to form hydroxyl radicals in solution, acting as an oxidant. Inventors found that the use of peroxide as the oxidant facilitates the formation of graphene quantum dots with a wide distribution of oxygen content, which provides a premise for subsequently obtaining graphene quantum dots with different oxygen contents. The peroxide can be an organic peroxide or an inorganic peroxide. For example, it can be at least one of hydrogen peroxide, ammonium persulfate, sodium persulfate, potassium hydrogen persulfate, sodium perborate, dibenzoyl peroxide and dilauroyl peroxide. Preferably, the peroxide is at least one of hydrogen peroxide, ammonium persulfate, or dibenzoyl peroxide.

Wherein a mass concentration of the graphene oxide in the graphene oxide dispersion prepared is preferably 0.1%-5%. If the concentration of the graphene oxide is too high, the system will be silk, which will affect the yield of the graphene quantum dot. If the concentration of the graphene oxide is low, the product collection will become difficult. A mass concentration of the peroxide solution is preferably 3%-30%. If the concentration of the peroxide solution is low, the yield of the graphene quantum dot will be low. If the concentration of the peroxide solution is high, it will easily lead to the instability of the reaction system and the heat released will be excessively high.

Inventor also finds that the carbon-to-oxygen ratio of the graphene oxide GO will influence the oxygen content of the final product of graphene quantum dots. Larger the carbon-to-oxygen ratio of raw material, the wider will be the oxygen content distribution of the graphene quantum dots. The carbon-to-oxygen ratio (C:O) of the graphene oxide can be 0.5-5. Preferably, the carbon-to-oxygen ratio of the graphene oxide is 1-2.

Step 2 is the preparation process of graphene quantum dots. The alkali liquor can be inorganic alkali liquor such as NaOH and KOH, or organic alkali liquor such as ethylenediamine, trimethylamine, n-butylamnine, tetramethylammonium hydroxide, etc. The alkali liquor is preferably a saturated solution. Step 2 may be: slowly adding the graphene oxide dispersion to the saturated alkali solution. Further, in order to control the reaction speed and improve the mixing uniformity of raw material, the mixing is preferably carried out dropwise, and the alkali liquor is kept in a stirring state before and during dripping. Specifically the graphene oxide dispersion is dripped into the stirred alkali solution dropwise. The stirring can be mechanical stirring or magnetic stirring, and the rotating speed can be 60 rpm-800 rpm. The temperature of mixed reaction of the graphene oxide dispersion and the saturated alkali solution can be 0-120° C., the reaction temperature has a certain impact on the size of the prepared graphene quantum dots. Higher the temperature, the smaller will be the size. But, the higher the temperature, the more drastic will be the reaction, and the harder will be to control the reaction. Preferably, the reaction temperature is 20° C.-30° C. The heating method is preferably water bath or oil bath.

Preferably, a volume ratio of the graphene oxide dispersion to the saturated alkali solution is (10-100): 1. Purification is done after the reaction, to get a graphene quantum dot dry powder. Purification can be performed as follows:

Filtrating the system after reaction, the filtrate is the graphene quantum dot solution;

Adjusting the pH of the graphene quantum dot solution to 6-7, hydrochloric acid or other acids can be used to adjust the pH value. After adjusting the pH value, evaporating slowly to dryness to obtain a mixed crystal of graphene quantum dots and salt.

Washing the mixed crystal of graphene quantum dots and salt with an organic solvent, filtering to remove the salt insoluble in organic phase after washing. Finally, evaporating the organic phase to dryness to obtain the graphene quantum dot dry powder.

Wherein, the organic solvent is preferably a polar organic solvent with a relatively high polarity. For example, it can be at least one of methanol, ethanol, ethylene glycol, 37% hydrochloric acid-methanol solution with a ratio of (0.5-10):1 (v/v), tetrahydrofuran (THF), formic acid, acetic acid, acetonitrile, N, N-dimethylformamide (DMF), diethyl ether, acetone. More preferably, the organic solvent is at least one of methanol, acetonitrile, tetrahydrofuran, 37% hydrochloric acid-methanol solution with a ratio of 1:1 (v/v).

When a graphene oxide quantum dot with a low oxygen content is needed, the following steps can be used to reduce the oxygen content of the graphene quantum dots after the purification: reacting the purified product with a reducing agent in an organic solvent, purifying to obtain the graphene quantum dot dry powder. Although the purified product is also a dry powder of graphene quantum dots, the oxygen content thereof is relatively high. After another step of reduction, graphene quantum dots with a relatively low oxygen content can be obtained. A person skilled in the art can choose whether to perform this step or not according to the requirement of the performance of the target product.

The reducing agent can be at least one of sodium borohydride, potassium borohydride, hydrazine hydrate, zinc-hydrochloric acid, iron-acetic acid, lithium aluminum hydride, sodium naphthalene, sodium amalgam, and Raney nickel. Preferably, the reducing agent is at least one of sodium borohydride, zinc-hydrochloric acid (1:2, molar ratio) and sodium amalgam. The reducing agent can be added in an amount of 2-2.5 equivalents (assuming the possible formula of GQDs with the highest oxygen content may be $C_2(OH)_2$, calculating the equivalent of the reducing agent accordingly).

The reaction medium, for the reduction reaction, i.e. the solvent, may be water or a tetrahydrofuran solution. This step can be specifically as follows: preparing the purified graphene quantum dot dry powder into a water or tetrahydrofuran solution with a mass concentration of 0.1-5%, heating in an air bath at a temperature of 25-100° C., preferably 30-60° C. Adding the reductant and refluxing for 0.5-4 hours to obtain a graphene quantum dot with a lower oxygen content, and then purifying to obtain a graphene quantum dot dry powder with a lower oxygen content. The purification can be specifically as follows:

Filtering the reaction system after the reduction reaction, evaporating the filtrate to obtain a mixed crystal of graphene quantum dots with low oxygen content and salt; washing the crystal with organic solvent; filtering to remove the salt insoluble in organic phase to obtain the graphene quantum dots dry powder with low oxygen content. Wherein the organic solvent is preferably an organic solvent with weak polarity, such as cyclohexane, n-hexane, petroleum ether (30-60), petroleum ether (60-90), petroleum ether (90-120), ethyl acetate, dimethyl carbonate, dichloromethane, trichloromethane, carbon tetrachloride, etc., which is preferably one or more selected from the group consisting of ethyl acetate, petroleum ether (60-90) and n-hexane.

Step 3 is the process of obtaining graphene quantum dots with different oxygen contents. A gradient elution method is used in the present invention. Specifically, the extraction of graphene quantum dots with different oxygen contents is achieved by using eluents of different polarities. Eluents with high polarity elutes graphene quantum dots with high oxygen content, while eluents with weak polarity elutes graphene quantum dots with low oxygen content.

This step is specially carried out by an advanced load first, and then gradient elution is performed. The advanced load helps to reduce the amount of eluent used and make the operation easier. The carrier can be alumina, silica gel for chromatography or activated carbon, and may specifically be alumina of 60-325 mesh, activated carbon of 60-325 mesh, or silica gel for chromatography of 60-325 mesh. Preferably, the carrier is a silica gel for chromatography, more preferably a silica gel for chromatography of 100-200 mesh.

The detail steps of the load can be as follows:

Adding the graphene quantum dot dry powder in a solvent to form a paste with a carrier, drying to obtain a carrier of the graphene quantum dots. More specifically, dissolving the graphene quantum dot dry powder in the solvent to prepare a solution with a mass percentage of 0.5-5%, then adding an equal volume of carrier into the solution, stirring slowly to form the paste, drying the obtained paste at room temperature to obtain a carrier loaded graphene quantum dots. Wherein, the solvent can be at least one of the organic solvents including methanol, ethanol, tetrahydrofuran, ethyl acetate, acetone, cyclohexane, dichloromethane, etc. Wherein the solvent is preferably one or more selected from the group consisting of methanol, tetrahydrofuran and dichloromethane.

The eluent used for gradient elution includes a first polar solvent and a second polar solvent, and the polarity of the first polar solvent is greater than the polarity of the second polar solvent, that is, the first polar solvent is a solvent with higher polarity, which may specifically include one or more of water, methanol, ethanol, ethylene glycol, hydrochloric acid-methanol solution, tetrahydrofuran, formic acid, acetic acid, acetonitrile, N, N-dimethylformamide, diethyl ether, acetone, and nitromethane; the second polar solvent is a solvent with weaker polarity, which comprises one or more of cyclohexane, n-hexane, petroleum ether, ethyl acetate, dimethyl carbonate, dichloromethane, trichloromethane, carbon tetrachloride. By changing the ratio of the first polar solvent to the second polar solvent, a change in the polarity of the eluent can be achieved. In the gradient elution, the volume ratio of the second polar solvent to the first polar solvent may be 1: (0.05-20).

Specifically, the gradient elution is performed using vacuum liquid chromatography or column chromatography. As a preferred embodiment of the present invention, the gradient elution is performed by vacuum liquid chromatography, that is, separating and purifying the carrier carrying the graphene quantum dots by vacuum liquid chromatography (VLC), to obtain graphene quantum dots with different oxygen contents. More specifically, the step is as follows:

Filling a short silica gel column, adding the carrier on which the GQDs obtained from the previous step were loaded to the top of the column for VLC vacuum liquid chromatography. The eluent used is a mixture of a weak polar solvent and a high polar solvent with a ratio of 1:(0.05-20). Wherein the elution is a batchwise elution. Graphene quantum dots with different oxygen contents are obtained after the elution. Subsequently, the purity of the eluted products can be respectively characterized by fluorescence. And the organic phase with a single component are evaporated to dryness to obtain the graphene quantum dots with different oxygen contents.

Vacuum liquid chromatography is used to purify the graphene quantum dots. The amount of eluent used is less, and the oxygen content distribution of graphene quantum dots isolated will be narrower.

The present invention provides a preparation method for graphene quantum dots with different oxygen contents, which includes the steps of: firstly, dispersing a graphene oxide in a peroxide solution to obtain a graphene oxide dispersion. Peroxide is used as an oxidant in this step. The peroxide can be helpful to form graphene quantum dots with a wide distribution of oxygen content, which provides a premise for subsequently obtaining graphene quantum dots with different oxygen contents. Then, mixing the graphene oxide dispersion with an alkali liquor to obtain a graphene quantum dot. Finally, performing a gradient elution to the graphene quantum dot after loading on a carrier, obtaining a plurality of graphene quantum dots with different oxygen contents after elution by changing the polarity of the eluent. It can be seen that the controlling of oxygen content of the graphene quantum dots is achieved by adopting the method provided by the present invention. Therefore, the control of the emission wavelength of the product is achieved, which provides a reliable premise for applications of the graphene quantum dots in the fields of LED, cell labeling, etc. In addition, the method provided by the present invention is also simple and easy to operate.

An embodiment of the present invention further provides a graphene quantum dot with an oxygen content of 2%-40%, an emission wavelength thereof can be 500 nm-750 nm, an oxygen content is preferably 15%-40%. Wherein the emission wavelength is preferably 550 nm-700 nm; the oxygen content is more preferably 15%-25%; and the emission wavelength is more preferably 550 nm-600 nm. The graphene quantum dots can be applied to fluorescent materials.

Correspondingly, another embodiment of the present invention further provides a fluorescent material. The fluorescent material includes the graphene quantum dots mentioned above. Specifically, the fluorescent material can be used as a fluorescent dye for cell labeling, an LED fluorescent powder, a light emitting layer material of WLED, etc.

The specific implementations of the present invention are described in detail below with reference to specific embodiments.

Embodiment 1

Dissolving a graphene oxide (C:O=5) in a hydrogen peroxide solution, wherein a concentration of the hydrogen peroxide is 5 wt %, dispersing by ultrasonic at a power of 180 W for 30 min to prepare a graphene oxide dispersion. Wherein, in the dispersion, a concentration of the graphene oxide is 0.3 wt %.

Configuring a Saturated Sodium Hydroxide Solution.

Heating the saturated sodium hydroxide solution in a water bath at 20° C. until the temperature of the system is the same as that of the water bath, mechanically or magnetically stirring with a speed of 100 rpm. Next, adding the graphene oxide dispersion dropwise to the saturated sodium hydroxide solution, wherein the reaction is conducted thoroughly by stirring. A volume ratio of the graphene oxide dispersion to the saturated sodium hydroxide solution is 10:1. After all the dropwise addition is completed, filtering the mixture, discarding the filter cake to obtain a graphene quantum dots (GQDs) aqueous solution.

Adjusting the pH value of the GQDs aqueous solution to 6-7 by adding hydrochloric acid. Then evaporating slowly to dry and obtain a mixed crystal of GQDs and salt. Washing the crystal with a 37% hydrochloric acid-methanol solution with a ratio of 5:1, filtering to remove the inorganic salt insoluble in the system, evaporating to remove the solvent to obtain a dry powder of GQDs.

Dissolving the GQDs dry powder in methanol to configure a methanol solution with a mass concentration of 5%, adding an equal volume of 200 mesh silica gel for chromatography, stirring slowly to form the paste, drying the obtained paste at room temperature to obtain a carrier carrying GQDs.

Filling a short silica gel column, adding the carrier on which the GQDs obtained from the previous step were loaded to the top of the column for VLC vacuum liquid chromatography. The eluent used is a mixture of ethyl acetate-methanol with a ratio of 1:0.05-1:10. Wherein the eluent is divided into 10 groups with ratios increasing from 1:0.05 to 1:10. And the elution is a batchwise elution. Wherein, the 1:3, 1:10 components belong to the pure phase. Evaporating the two pure phases to dryness respectively to obtain graphene quantum dot dry powders with different oxygen contents. Marking the powders as Sample 1 and Sample 2, respectively. FIG. 1 is an atomic force microscope image of Sample 1. It can be seen from the figure that the prepared product are graphene quantum dots, and the sizes thereof are roughly evenly distributed. The samples are subjected to an elemental analysis, the results are as follows:

|  | [N]% | [C]% | [H]% | [S]% | [O]% |
| --- | --- | --- | --- | --- | --- |
| Sample 1 | 0 | 74.874 | 2.384 | 0.006 | 22.736 |
| Sample 2 | 0 | 68.85 | 3.005 | 0.006 | 28.139 |

It can be seen that graphene quantum dots with different oxygen contents are prepared in the present embodiment.

Figure 2:
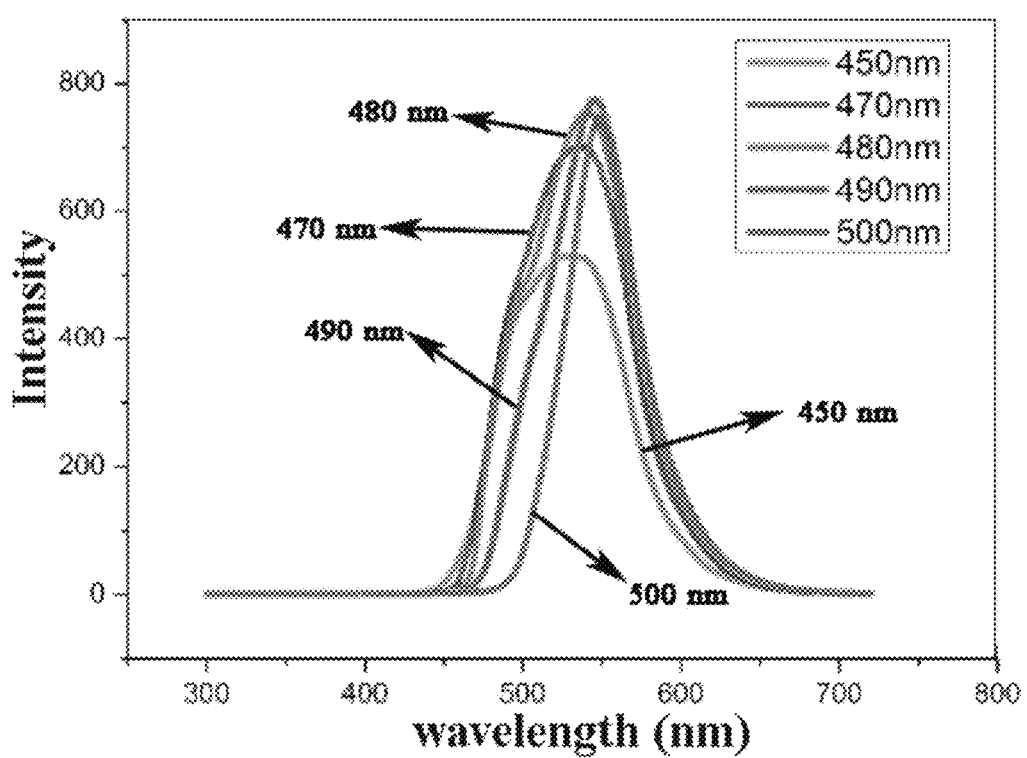
FIG. 2 is a fluorescence spectrum of Sample 1 under different excitation wavelengths in Embodiment 1 of the present invention.

Sample 1 is subjected to fluorescent test analysis, the analysis results are shown in FIG. 2. It can be seen from FIG. 2 that the prepared graphene quantum dots are stimulus dependent. The emission peaks are different when the light of different wavelengths excites the graphene quantum dots. The prepared graphene quantum dots have unique fluorescence characteristics.

Embodiment 2

Dissolving GO (C:O=1) in an ammonium persulfate solution, wherein a concentration of the ammonium persulfate is 30 wt %, dispersing under ultrasonic at a power of 120 W for 1 hour to prepare a graphene dispersion. Wherein in the dispersion, a concentration of GO is 4.5 wt %.

Configuring a Saturated Potassium Hydroxide Solution.

Heating the saturated potassium hydroxide solution in an oil bath at 120° C. until the temperature of the system is the same as that of the oil bath, mechanical stirring or magnetic stirring with a speed of 500 rpm. Next, adding the graphene oxide dispersion dropwise to the saturated potassium hydroxide solution, wherein the reaction is conducted thoroughly by stirring. A volume ratio of the graphene oxide dispersion to the saturated potassium hydroxide solution is 100:1. After all the dropwise addition is completed, filtering the mixture, discarding the filter cake to obtain a GQDs aqueous solution.

Adjusting the pH value of the aqueous solution of GQDs to 6-7 by adding hydrochloric acid. Then evaporating slowly to dryness to obtain a mixed crystal of GQDs and salt. Washing the crystal with tetrahydrofuran, filtering to remove the inorganic salt insoluble in THF, evaporating to remove the THF to obtain a dry powder of GQDs.

Preparing the GQDs dry powder into an aqueous solution with a concentration of 1%, heating in an air bath at a temperature of 95° C., adding 2.5 equivalents of hydrazine hydrate to reduce the GQDs, refluxing for 2 hours, after the reaction, filtering to remove all the possible residue, quenching the excess reducing agent with hydrochloric acid, evaporating the filtrate to dryness to obtain a mixed crystal of low oxygen content GQDs and salts, washing the crystal with ethyl acetate, filtering to remove the inorganic salt insoluble in ethyl acetate to obtain a dry powder of GQDs with low oxygen content.

Dissolving the dry powder in methanol to configure a solution with a mass concentration of 5%, adding an equal volume of 200 mesh silica gel for chromatography, stirring slowly to form the paste, drying the obtained paste at room temperature to obtain a carrier carrying GQDs.

Figure 3:
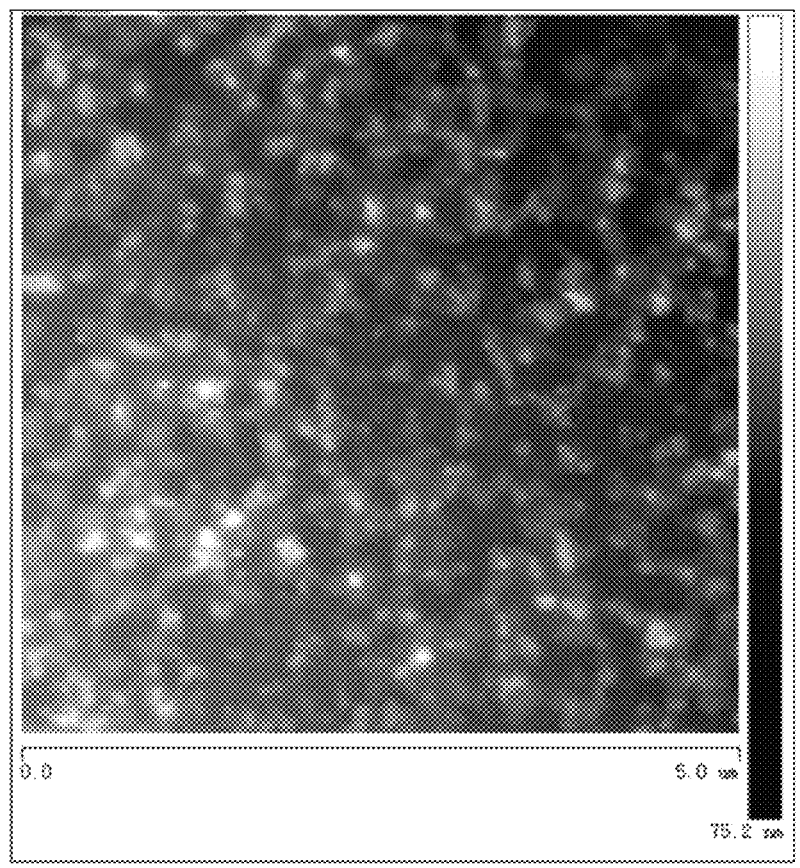
FIG. 3 is an atomic force microscope image of Sample 3 in Embodiment 2 of the present invention.

Filling a short silica gel column, adding the carrier on which the GQDs obtained from the previous step were loaded to the top of the column for VLC vacuum liquid chromatography. The eluent used is a mixture of dichloromethane-ethanol with a ratio of 1:0.05-1:10. Wherein the eluent is divided into 10 groups with ratios increasing from 1:0.05 to 1:1. And the elution is a batchwise elution. Wherein, the 1:0.155, 1:0575 and 1:1 components belong to the pure phase. Evaporating the three pure phases to dryness respectively to obtain graphene quantum dot dry powders with different oxygen contents. Marking the powders as Sample 3, Sample 4 and Sample 5, respectively. FIG. 3 is an atomic force microscope image of Sample 3. It can be seen from the figure that the prepared product are graphene quantum dots.

The samples above are subjected to an elemental analysis, the results are as follows:

|  | [N]% | [C]% | [H]% | [S]% | [O]% |
|---|---|---|---|---|---|
| Sample 3 | 1.56 | 95.671 | 0.016 | 0 | 2.747 |
| Sample 4 | 0.76 | 91.92 | 0.744 | 0 | 6.576 |
| Sample 5 | 1.82 | 88.63 | 1.181 | 0 | 8.369 |

It can be seen that graphene quantum dots with different oxygen contents are prepared in the present embodiment.

Embodiment 3

Dissolving GO (C:O=2) in a potassium persulfate solution, wherein a concentration of the potassium persulfate solution is 20 wt %, dispersing under ultrasonic at a power of 100 W for 2 hours to prepare a graphene dispersion. Wherein, in the dispersion, a concentration of GO is 2 wt %.

Configuring a Saturated Sodium Hydroxide Solution.

Heating the saturated sodium hydroxide solution in a water bath at 80° C. until the temperature of the system is the same as that of the water bath, mechanically or magnetically stirring with a speed of 500 rpm. Next, adding the graphene oxide dispersion dropwise to the saturated sodium hydroxide solution, wherein the reaction is conducted thoroughly by stirring. A volume ratio of the graphene oxide dispersion to the saturated sodium hydroxide solution is 50:1. After all the dropwise addition is completed, filtering the mixture, discarding the filter cake to obtain a GQDs aqueous solution.

Adjusting the pH value of the aqueous solution of GQDs to 6-7 by adding hydrochloric acid. Then evaporating slowly to dry and obtain a mixed crystal of GQDs and salt. Washing the crystal with tetrahydrofuran, filtering to remove the inorganic salt insoluble in THF, evaporating to remove the THF to obtain a dry powder of GQDs.

Preparing the GQDs dry powder into an aqueous solution with a concentration of 2%, heating in an air bath at a temperature of 30° C., adding 2 equivalents of hydrazine hydrate to reduce the GQDs, refluxing for 2 hours, after the reaction, filtering to remove all the possible residue, quenching the excess reducing agent with hydrochloric acid, evaporating the filtrate to dry and obtain a mixed crystal of low oxygen content GQDs and salts, washing the crystal with ethyl acetate, filtering to remove the inorganic salt insoluble in ethyl acetate to obtain a dry powder of GQDs with low oxygen content.

Mixing the GQDs dry powder with low oxygen content obtained in Embodiment 1 with the GDQs with higher oxygen content obtained in the present embodiment at a ratio of 1:1, dissolving the mixture in methanol to configure a solution with a mass concentration of 3%, adding an equal volume of 200 mesh silica gel for chromatography, stirring slowly to form the paste, drying the obtained paste at room temperature to obtain a carrier carrying GQDs.

Figure 4:
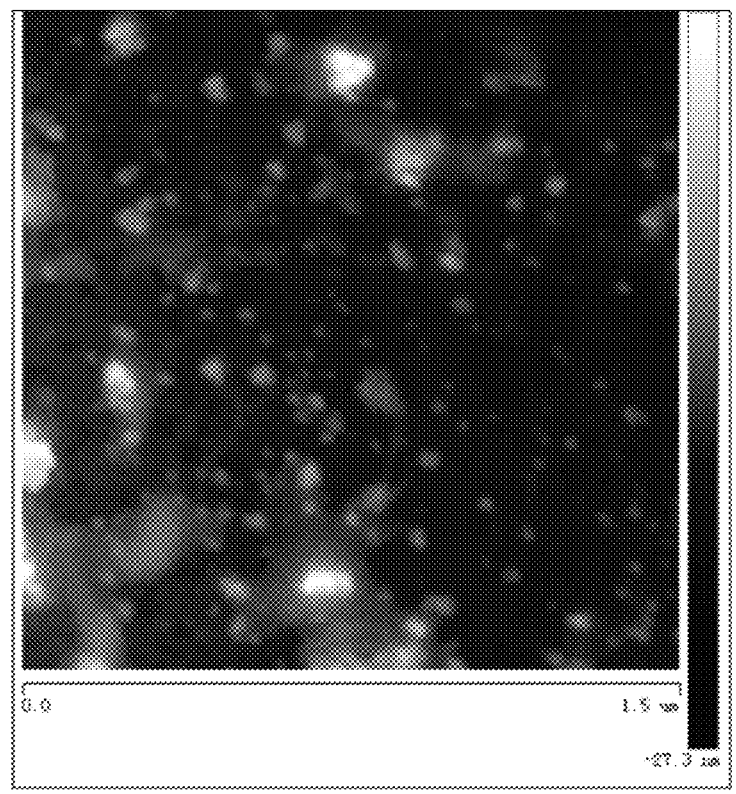
FIG. 4 is an atomic force microscope image of Sample 6 in Embodiment 3 of the present invention.

Filling a short silica gel column, adding the carrier on which the GQDs obtained from the previous step were loaded to the top of the column for VLC vacuum liquid chromatography. The eluent used is a mixture of petroleum ether (boiling range 60-90)-acetone with a ratio of 1:0.05-1:20. Wherein the eluent is divided into 20 groups with ratios increasing from 1:0.05 to 1:20. And the elution is a batchwise elution. Wherein, the 1:1, 1:15 and 1:20 components belong to the pure phase. Evaporating the three pure phases to dryness respectively to obtain graphene quantum dot dry powders with different oxygen contents. Marking the powders as Sample 6, Sample 7 and Sample 8, respectively. FIG. 4 is an atomic force microscope image of Sample 6. It can be seen from the figure that the prepared product are graphene quantum dots.

The samples above are subjected to an elemental analysis, the results are as follows:

|  | [N]% | [C]% | [H]% | [S]% | [O]% |
|---|---|---|---|---|---|
| Sample 6 | 1.09 | 95.262 | 0.006 | 0 | 3.642 |
| Sample 7 | 0.001 | 80.63 | 1.973 | 0.002 | 17.385 |
| Sample 8 | 0 | 75.242 | 2.802 | 0.004 | 21.952 |

It can be seen that graphene quantum dots with different oxygen contents are prepared in the present embodiment.

Embodiment 4

Dissolving GO (C:O=4) in an dibenzoyl peroxide solution, wherein a concentration of the dibenzoyl peroxide solution is 30 wt %, dispersing under ultrasonic wave at a power of 100 W for 2 hours to prepare a graphene dispersion. Wherein in the dispersion, a concentration of GO is 4 wt %.

Configuring a Saturated Ethylene Diamine Solution.

Heating the saturated ethylene diamine solution in a water bath at 80° C. until the temperature of the system is the same as that of the water bath, mechanical stirring or magnetic stirring with a speed of 500 rpm. Next, adding the graphene oxide dispersion dropwise to the saturated ethylene diamine solution, wherein the reaction is conducted thoroughly by stirring. A volume ratio of the graphene oxide dispersion to the saturated ethylene diamine solution is 80:1. After the dropwise addition is completed, filtering the mixture, discarding the filter cake to obtain a GQDs aqueous solution.

Adjusting the pH value of the aqueous solution of GQDs to 6-7 by adding hydrochloric acid. Then evaporating slowly to dry and obtain a mixed crystal of GQDs and salt. Washing the crystal with tetrahydrofuran, filtering to remove the inorganic salt insoluble in THF, evaporating to remove the THF to obtain a dry powder of GQDs.

Dissolving the GQDs dry powder in methanol to configure a solution with a mass concentration of 3%, adding an equal volume of 200 mesh silica gel for chromatography, stirring slowly to form the paste, drying the obtained paste at room temperature to obtain a carrier carrying GQDs.

Figure 5:
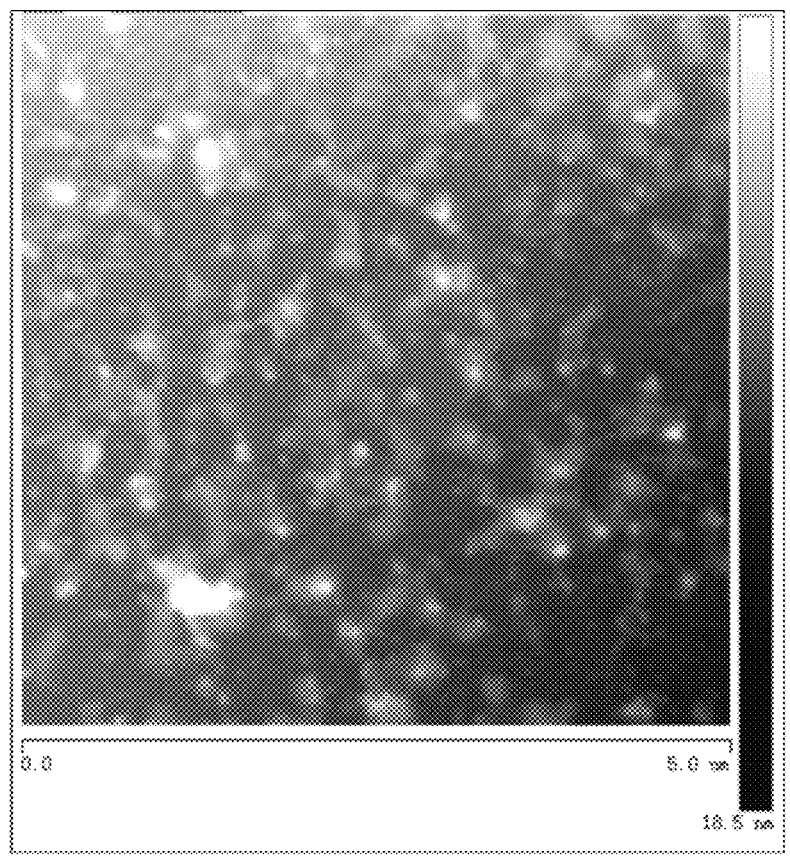
FIG. 5 is an atomic force microscope image of Sample 10 in Embodiment 4 of the present invention.

Filling a short silica gel column, adding the carrier on which the GQDs obtained from the previous step were loaded to the top of the column for VLC vacuum liquid chromatography. The eluent used is a mixture of ethyl acetate-methanol with a ratio of 1:0.05-1:20. Wherein the eluent is divided into 20 groups with ratios increasing from 1:0.05 to 1:20. And the elution is a batchwise elution. Wherein, the 1:6, 1:13 and 1:18 components belong to the pure phase. Evaporating the three pure phases to dryness respectively to obtain graphene quantum dot dry powders with different oxygen contents. Marking the powders as Sample 9, Sample 10 and Sample 11, respectively. FIG. 5 is an atomic force microscope image of Sample 10. It can be seen from the figure that the prepared product are graphene quantum dots.

The samples above are subjected to an elemental analysis, the results are as follows:

|  | [N]% | [C]% | [H]% | [S]% | [O]% |
| --- | --- | --- | --- | --- | --- |
| Sample 9 | 0.228 | 69.351 | 0.064 | 0.003 | 30.354 |
| Sample 10 | 0.005 | 63.872 | 1.811 | 0 | 34.312 |
| Sample 11 | 0.034 | 59.096 | 2.135 | 0.004 | 38.731 |

It can be seen that graphene quantum dots with different oxygen contents are prepared in the present embodiment.

Figure 6:
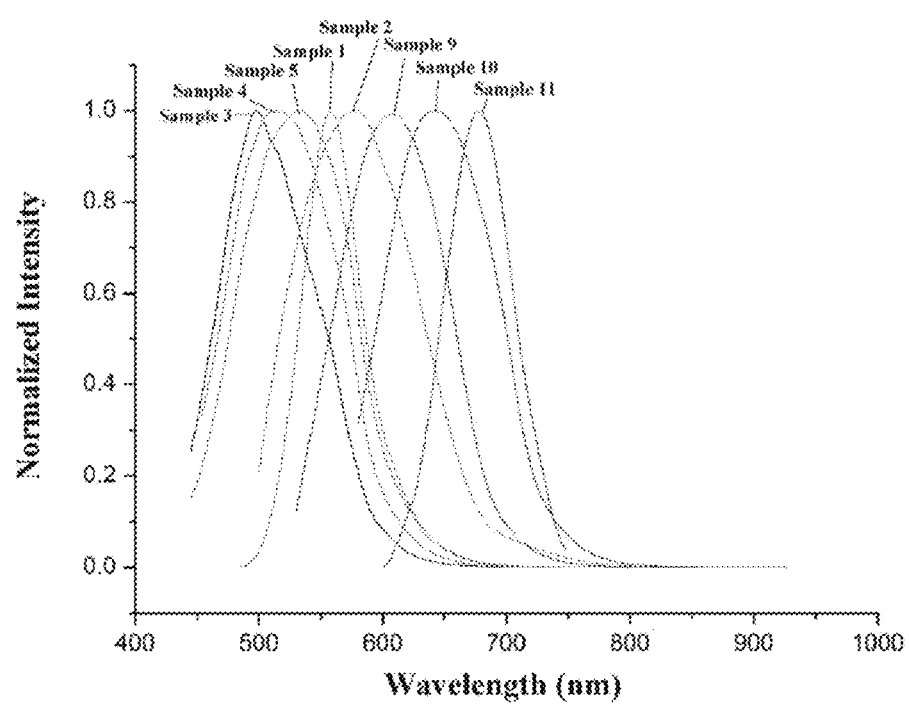
FIG. 6 is a normalized fluorescence spectrum of Samples 1-5 and Samples 9-11 in the Embodiments of the present invention.

Samples 1 to 5, and Samples 9 to 11 were subjected to fluorescence analysis, and the results are shown in FIG. 6. The emission wavelengths of these samples were 557 nm, 577 nm, 497 nm, 511 nm, 532 nm, 607 nm, 643 nm and 677 nm, respectively.

As can be seen from FIG. 6, when the oxygen contents of the graphene quantum dots are different, the fluorescence emission wavelengths are also different. The method provided by the present invention can prepare graphene quantum dots with emission wavelengths of 500-750 nm. In particular, graphene quantum dots with emission wavelengths of 550-700 nm can be prepared.

The foregoing descriptions are merely preferred embodiments of the present invention, and are not used to limit the present invention. Any modifications, equivalent replacements and improvements made within the spirit and principle of the present invention should be included for the protection within the scope.

The invention claimed is:

1. A preparation method for graphene quantum dots with different oxygen contents, comprising following steps:
step 1: dispersing a graphene oxide in a peroxide solution containing hydroxyl radicals to obtain a graphene oxide dispersion;
step 2: mixing the graphene oxide dispersion with an alkali liquor, purifying to obtain a graphene quantum dot dry powder,
wherein a purifying step comprises reacting the purified product with a reducing agent in a solvent reduce an oxygen content of the graphene quantum dots, and purifying to obtain the graphene quantum dot dry powder, wherein the reducing agent is at least one of potassium borohydride, zinc-hydrochloric acid, iron-acetic acid, lithium aluminum hydride, sodium naphthalene, sodium amalgam, and Raney nickel, and
step 3: loading the graphene quantum dot dry powder on a carrier, performing a gradient elution to obtain a plurality of graphene quantum dots with different oxygen contents.

2. The preparation method for graphene quantum dots with different oxygen contents according to claim 1, wherein a mass concentration of the graphene oxide in the graphene oxide dispersion is 0.1%-5%; and/or, a mass concentration of the peroxide solution is 3%-30%.

3. The preparation method for graphene quantum dots with different oxygen contents according to claim 1, wherein the peroxide is at least one selected from the group consisting of hydrogen peroxide, ammonium persulfate, sodium persulfate, potassium hydrogen persulfate, sodium perborate, dibenzoyl peroxide and dilauroyl peroxide.

4. The preparation method for graphene quantum dots with different oxygen contents according to claim 1, wherein the gradient elution in step 3 includes performing the gradient elution using a vacuum liquid chromatography or a column chromatography.

5. The preparation method for graphene quantum dots with different oxygen contents according to claim 4, wherein an eluent used for the gradient elution includes a first polar solvent and a second polar solvent, wherein a polarity of the first polar solvent is greater than that of the second polar solvent, wherein the first polar solvent is one or more selected from the group consisting of water, methanol, ethanol, ethylene glycol, hydrochloric acid-methanol solution, tetrahydrofuran, formic acid, acetic acid, acetonitrile, N, N-dimethylformamide, diethyl. ether, acetone and nitromethane, wherein the second polar solvent is one or more selected from the group consisting of cyclohexane, n-hexane, petroleum ether, ethyl acetate, dimethyl carbonate, dichloromethane, trichloromethane and carbon tetrachloride.

6. The preparation method for graphene quantum dots with different oxvaen contents according to claim 1, wherein the dots produced have an emission wavelength is 550 nm-750 nm.

7. The preparation method for graphene quantum dots with different oxygen contents according to claim 2, wherein the gradient elution in step 3 includes performing the gradient elution using a vacuum liquid chromatography or a column chromatography.

8. The preparation method for graphene quantum dots with different oxygen contents according to claim 3, wherein the gradient elution in step 3 includes performing the gradient elution using a vacuum liquid chromatography or a column chromatography.

9. A preparation method for graphene quantum dots with different oxygen contents, comprising:
- a step of converting a graphene oxide to a graphene quantum dot powder and a step of purifying the graphene quantum dot powder,
- wherein the step for converting a graphene oxide to a graphene quantum dot consists of:
- step 1: dispersing a graphene oxide in a peroxide solution containing hydroxyl radicals to obtain a graphene oxide dispersion;
- step 2: mixing the graphene oxide dispersion with an alkali liquor, purifying to obtain a graphene quantum dot dry powder,
- wherein the step of purifying the graphene quantum dot powder comprises:
- step 3: reacting the purified product with a reducing agent in a solvent reduce an oxygen content of the graphene quantum dots, and purifying to obtain the graphene quantum dot dry powder, wherein the reducing agent is at least one of: potassium borohydride, zinc-hydrochloric acid, iron-acetic acid, lithium aluminum hydride, sodium naphthalene, sodium amalgam, and Raney nickel, and
- step 4: loading the graphene quantum dot dry powder on a carrier, performing a gradient elution to obtain a plurality of graphene quantum dots with different oxygen contents.

* * * * *